United States Patent [19]
Tuhro et al.

[11] Patent Number: 6,151,117
[45] Date of Patent: Nov. 21, 2000

[54] OPTICAL SENSOR WITH TELECENTRIC OPTICS

[75] Inventors: Richard H. Tuhro; Robert P. Herloski, both of Webster, N.Y.

[73] Assignee: Xerox Corporation, Stamford, Conn.

[21] Appl. No.: 09/385,738

[22] Filed: Aug. 30, 1999

[51] Int. Cl.[7] .................................................. G01B 11/14
[52] U.S. Cl. .................... 356/375; 356/431; 250/559.29; 250/559.36
[58] Field of Search ...................................... 356/375, 430, 356/431, 429; 250/548, 559.01, 559.06, 559.11, 559.29, 559.36, 559.4

[56] References Cited

U.S. PATENT DOCUMENTS

| 3,782,834 | 1/1974 | Fujimori et al. | 356/429 |
| 5,008,743 | 4/1991 | Katzir et al. | 358/101 |
| 5,138,178 | 8/1992 | Wong et al. | 356/429 |
| 5,897,611 | 4/1999 | Case et al. | 356/400 |

OTHER PUBLICATIONS

Article—The Telecentric Stop, Example of Telecentric Optical System, *Modern Optical Engineering* by Warren Smith, p. 131.

*Primary Examiner*—Hoa Q. Pham
*Attorney, Agent, or Firm*—John M Kelly

[57] ABSTRACT

A substrate sensor system having a light source for radiating light toward a substrate position, a light sensor system positioned to receive light transmitted or reflected at the substrate, a lens that images the light transmitted or reflected at the substrate onto the light sensor system, and a telecentric stop between the lens and the light sensor system. Beneficially, such substrate sensor systems will include an electrical circuit that produces position information regarding the position of a substrate and/or the position of an image on a substrate.

20 Claims, 3 Drawing Sheets

OPTICAL SENSOR WITH TELECENTRIC OPTICS

FIELD OF THE INVENTION

This invention relates to substrate and/or image sensors.

BACKGROUND OF THE INVENTION

Electrophotographic marking is a well-known and commonly used method of copying or printing original documents. Electrophotographic marking is performed by exposing a light image representation of a desired document onto a substantially uniformly charged photoreceptor. In response to that light image the photoreceptor discharges, creating an electrostatic latent image of the desired document on the photoreceptor's surface. Toner particles are then deposited onto the latent image to form a toner image. That toner image is then transferred from the photoreceptor onto a receiving substrate such as a sheet of paper. The transferred toner image is then fused to the receiving substrate. The surface of the photoreceptor is then cleaned of residual developing material and recharged in preparation for the production of another image.

Most electrophotographic marking machines automatically fed various substrates, typically paper documents, through the machine. For example, blank sheets of paper or documents to be copied are automatically fed through the machine. To assist the marking process it is important that the positions of those moving substrates be tracked as they are fed. One way of tracking substrate positions is to use optical sensors.

Optical sensors provide electrical signals that depend upon the presence, absence, arrival, and/or departure of substrates at a sensed position. Other optical sensors provide information regarding the existence and position of marks on the substrate. FIG. 1 shows a schematic diagram of a typical prior art substrate sensor system 12. As shown, a light emitting diode (LED) 54 emits light at a particular location. A phototransistor 56 is positioned to receive light from the LED 54 when a substrate is not between the LED 54 and the phototransistor 56. When a substrate 58 comes between the LED 54 and the phototransistor 56 the light from the LED 54 is blocked from reaching the phototransistor 56. When light is received by the phototransistor 56 a relatively high electrical signal $V_1$ is applied to a Schmitt trigger 60. When light is not received by the phototransistor 56 a relatively low electrical signal is applied to the Schmitt trigger 60. The Schmitt trigger then outputs a signal $V_0$ with one state when a high electrical signal $V_1$ is present and the other state if a high electrical signal is not present. The signal $V_0$ thus signifies either the presence or the absence of a substrate 58 between the LED 54 and phototransistor 56. Additionally, since the signal $V_0$ makes a transition from one state to the other when either a leading edge or a trailing edge of the substrate 58 passes the sensing location, the state transition of $V_0$ signals the arrival or departure of a substrate at the sending position.

While the substrate sensor system 12 is generally successful, it has a limited sensitivity to document position. This is because the LED 54 emits light over a rather large area (thus is not a point source), because the phototransistor is sensitive to light over a relatively large area (thus is not a point sink), and because the document's position in the z-direction (the substrate 58 is in the x-y plane) is not well controlled. Therefore, when using the substrate sensor system 12 the absolute position of the leading and trailing edges are not accurately known. While position errors may only be tens of microns, in modern high quality electrophotographic printers such errors can be significant.

One way of improving the substrate sensor system 12 would be to incorporate a simple imaging lens between the substrate and phototransistor, forming an image of the substrate onto an image plane located at the phototransistor. The phototransistor could also be replaced with an image sensor. This has the advantage that the magnification can be adjusted by selecting the lens focal length and the front and back conjugates. This is desirable since it may be advantageous to operate with a different size image on the sensor than is present in the paper path. However, with a simple lens as the substrate's position changes in the z direction the magnification varies. This magnification variation changes the size of the image, and hence the apparent position of the document's leading edge, just what is trying to be measured. Therefore, a substrate sensor system that is substantially tolerant of z direction variations would be beneficial.

SUMMARY OF THE INVENTION

The principles of the present invention provide for substrate sensor systems that are tolerant of z direction variations. A substrate sensor system that is in accord with the principles of the present invention includes a light source for radiating light toward a substrate position, a light sensor system positioned to receive light transmitted or reflected from the substrate, a lens that images the light transmitted or reflected from the substrate onto the light sensor system, and a telecentric stop between the lens and the light sensor system. Beneficially, such substrate sensor systems will also include an electrical circuit that produces position information regarding the position of a substrate and/or the position of an image on a substrate.

BRIEF DESCRIPTION OF THE DRAWINGS

Other aspects of the present invention will become apparent as the following description proceeds and upon reference to.

DETAILED DESCRIPTION OF EMBODIMENTS OF THE INVENTION

The principles of the present invention are illustrated below in relation to alternative substrate sensor systems. However, it is to be understood that the present invention is applicable to other substrate sensor systems.

Figure 1:
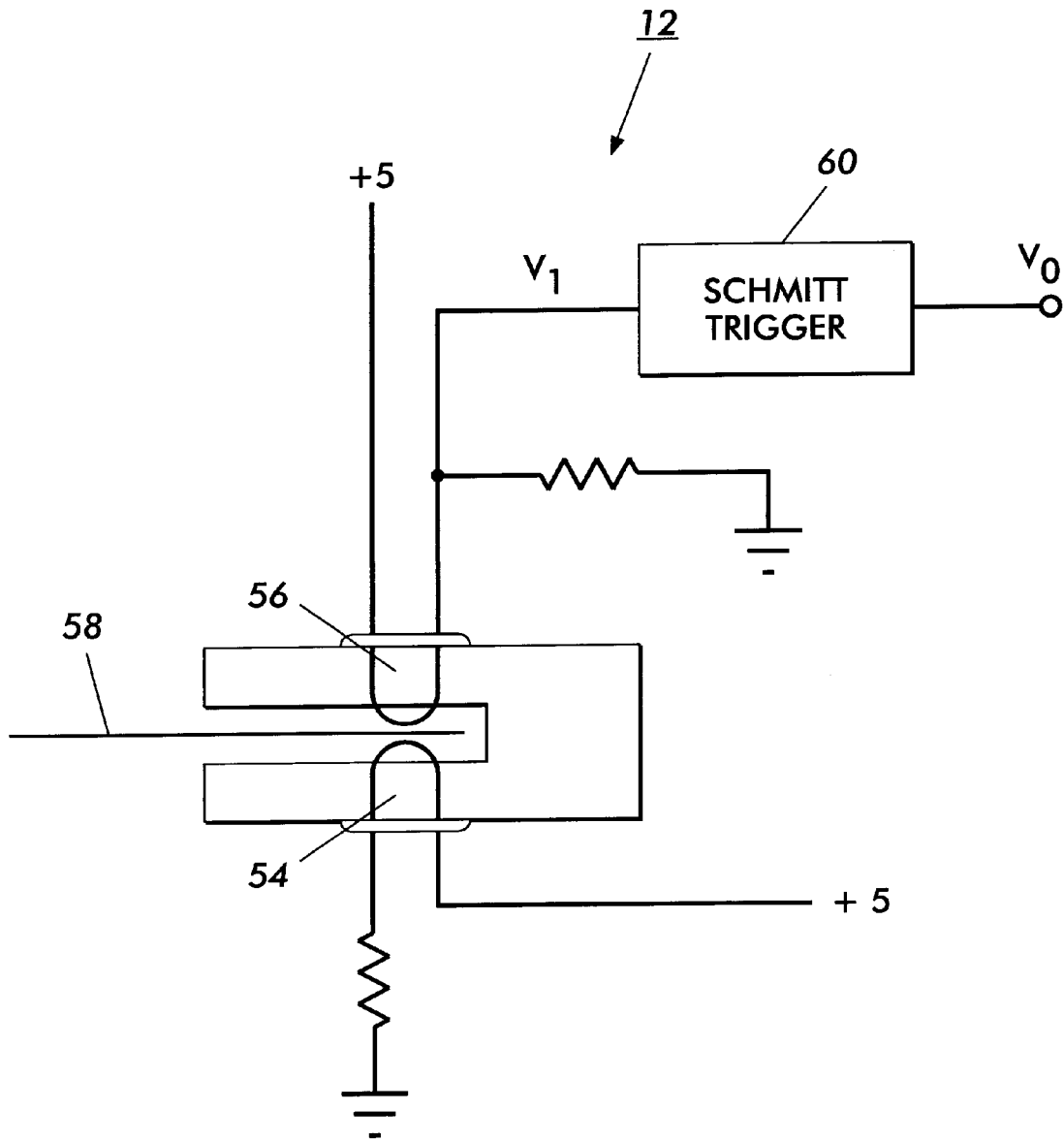
FIG. 1, which illustrates a prior art substrate sensor system.
Figure 2:
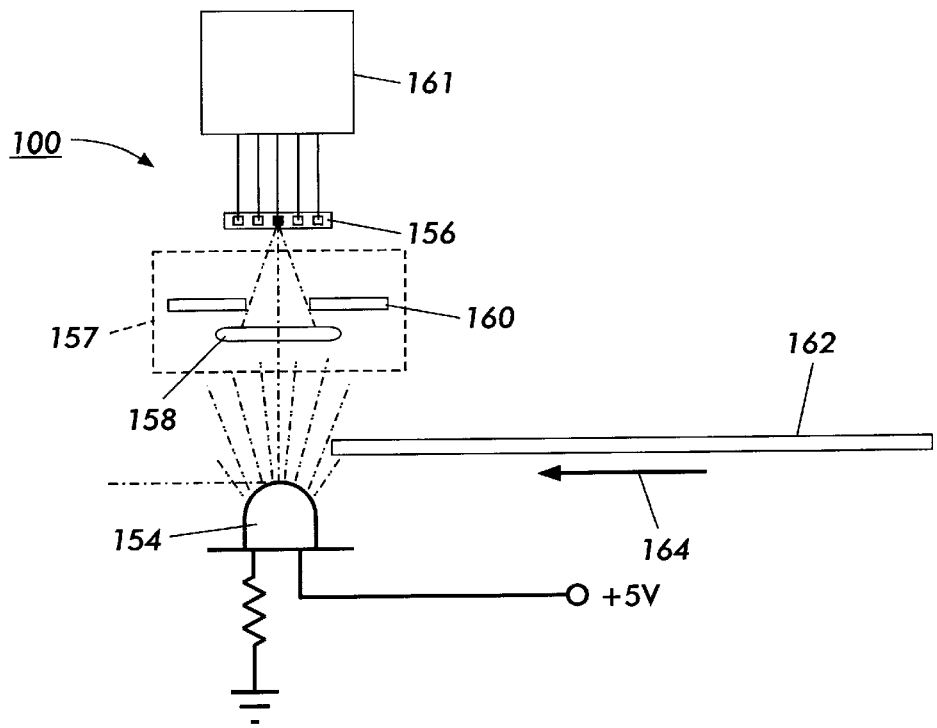
FIG. 2, which illustrates a substrate sensor system that is in accord with the principles of the present invention.

FIG. 2 illustrates a transmissive substrate sensor system 100 that is in accord with the principles of the present invention. As shown, a light emitting diode (LED) 154 emits light toward a linear photosensor array 156 that converts photons to electrons. An optical assembly 157 includes a lens 158 that images light transmitted past a substrate 162 onto the linear photosensor array. The optical assembly 157 further includes a telecentric stop 160. Reference, "The Telecentric Stop," p. 131 of *Modern Optical Engineering* by Warren Smith, McGraw-Hill, New York, 1966. Electrical signals from the linear photosensor array 156 are applied to a position determining network 161.

The components of the substrate sensor system are arranged such that the substrate 162 moving in a direction 164 can come between the LED 154 and the lens 158. The substrate, which can be a document, or a photoreceptor belt, or other moving material, is nominally located in the object plane of the lens. The telecentric stop reduces the impact of z-direction variations in the position of the substrate. As the substrate moves in the direction 164 it begins to reduce that light that reaches the individual photosensitive elements of the linear photosensor array 156. The position determining network 161 senses this light reduction and determines that the substrate is entering the sensing area. As the substrate continues to advance the light that reaches the individual photosensitive elements of the linear photosensor array 156 continues to drop. The position determining network 161 can thus accurately track the advancement of the substrate.

Figure 3:
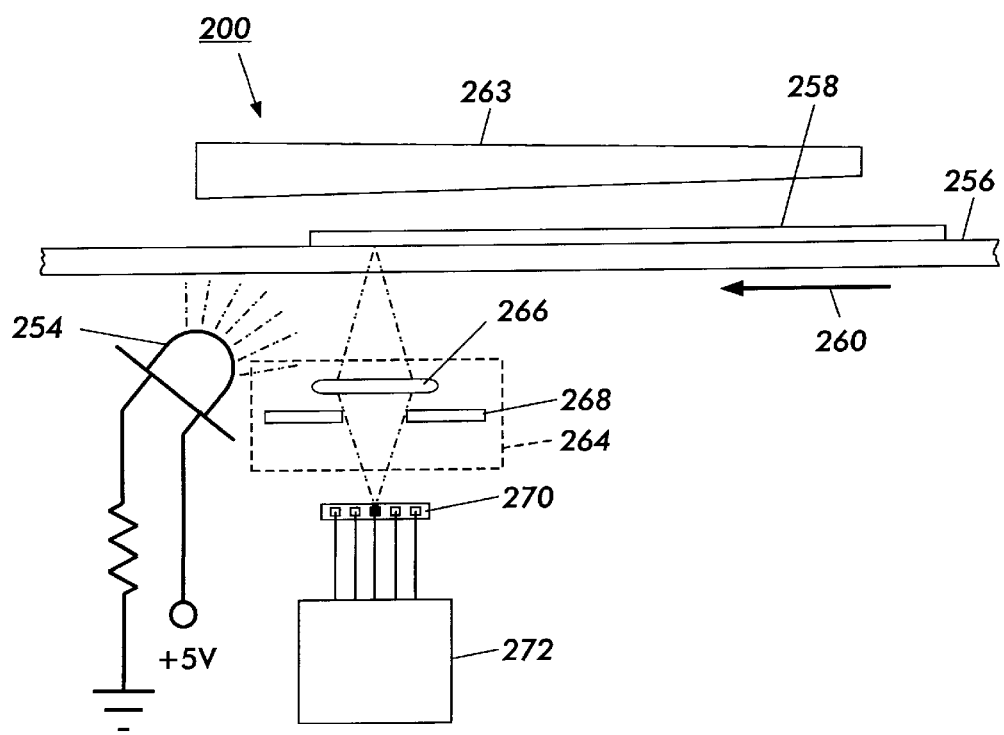
FIG. 3, which illustrates an alternative substrate sensor system that is also in accord with the principles of the present invention.

FIG. 3 illustrates a reflective substrate sensor system 200 that is also in accord with the principles of the present invention. As shown an LED 254 emits light toward a transparent platen 256 on which a document 258 is moving in a direction 260. Over the platen is a black (nonreflective) cover 263. Below the platen 256 is an optical assembly 264 having a lens 266 that gathers light reflected from the document 258. The optical assembly 264 further includes a telecentric stop 268. The optical assembly images light reflected by the document onto a linear photosensor array 270 that converts photons to electrons. Electrical signals from the linear photosensor array 270 are applied to an image determining network 272.

If the document 258 has not yet reached a sensing position in front of the optical assembly 264 most of the LED light is absorbed by the cover 263. However, when the document 258 enters a sensing area some of the light from the LED reflects from the document onto the photosensor array 270. The image determining network 272 senses this light increase and determines that the substrate is entering the sensing area. As the substrate continues to advance the light that reaches the individual photosensitive elements of the linear photosensor array 270 continues to increase. The image determining network 272 can thus accurately track the advancement of the substrate into and out of the sensing area. Significantly, the telecentric stop reduces the impact of z-direction variations in the position of the substrate.

Figure 4:
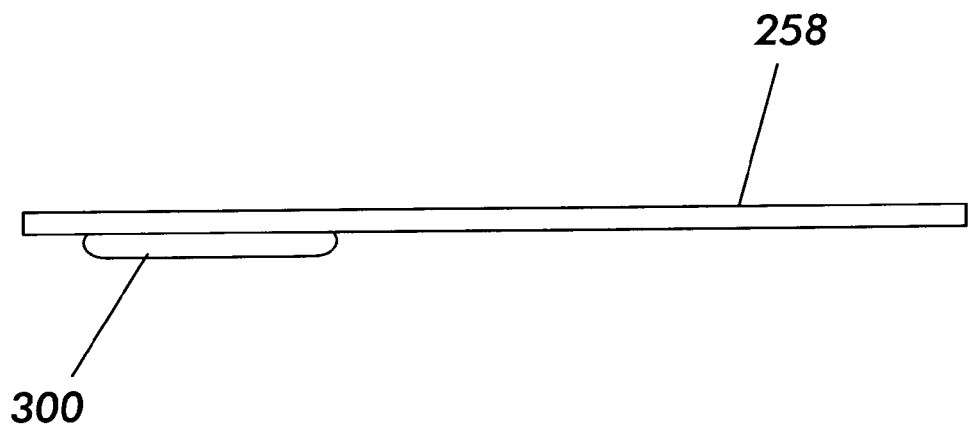
FIG. 4, which illustrates a substrate having an image area.

While the foregoing has described illustrated the principles of the present invention in relation to a substrate, it is also possible to use the principles of the present invention when sensing the position of images on a substrate. For example, referring now to FIGS. 3 and 4, if the substrate 258 has an image 300, the light and dark areas of the image 300 will be imaged onto the linear photosensor array. These light and dark areas can be sensed by the image determining network to determine the position of the image on the document. Thus, the principles of the present invention are useful for locating images on a substrate.

The foregoing has freely made use various terms that are helpful in describing the principles of the present invention and the illustrated embodiments. While such terms carry their ordinary meaning, the term "substrate" requires particular attention. As used in the illustrated embodiments the term substrate seems to denote a sheet media of some type, such as paper or mylar. However, substrate is meant to denote any material suitable for carrying another material. For example, the term substrate includes the photoreceptor. This is significant since one very useful application of the principles of the present invention is sensing registration ("fiducial") marks on a photoreceptor. By using the present invention to track such marks the position of the photoreceptor can be accurately known.

Because of the wide applicability of the present invention for position and imaging sensing, the foregoing figures and the descriptions only illustrate the present invention. Others skilled in the applicable arts will recognize numerous adaptations of the illustrated embodiments that will remain within the principles of the present invention. Therefore, the present invention is to be limited only by the appended claims.

What is claimed:

1. A position sensing system comprised of:

a light source for emitting light onto a substrate;

a lens for imaging a portion of said emitted light onto an image plane, wherein said imaged portion depends upon a position of said substrate in an x-y plane;

a light sensor system at said image plane for producing electrical signals from said imaged light;

an electrical circuit for determining said position of said substrate from said electrical signals; and a telecentric stop between said lens and said light sensor system, said telecentric stop for reducing variations of said imaged light caused by changes in position of said substrate in a z-direction.

2. A position sensing system according to claim 1, further including a platen for holding a substrate.

3. A position sensing system according to claim 2, wherein said platen is between said light source and said lens.

4. A position sensing system according to claim 1, wherein said light sensor system is an array of individual photosensitive elements.

5. A position sensing system according to claim 4, wherein said array includes a linear array of individual photosensitive elements.

6. A position sensing system according to claim 1, wherein said light source is a light emitting diode.

7. A position sensing system according to claim 1, wherein said light source and said light sensor system are on the same side of said substrate.

8. A position sensing system according to claim 7, wherein said light sensor system is an array of individual photosensitive elements.

9. A position sensing system according to claim 8, wherein said array includes a linear array of individual photosensitive elements.

10. A position sensing system according to claim 7, wherein said light source is a light emitting diode.

11. An image sensing system comprised of:

a substrate having an image area;

a light source for emitting light onto said substrate;

a lens for imaging a portion of said emitted light onto an image plane, wherein said imaged portion depends upon a position of said substrate in an x-y plane;

a light sensor system at said image plane for producing electrical signals from said imaged light;

an electrical circuit for determining said position of said substrate from said electrical signals; and a telecentric stop between said lens and said light sensor system, said telecentric stop for reducing variations of said imaged light caused by changes in position of said substrate in a z-direction.

12. An image sensing system according to claim 11, further including a platen for holding said substrate.

13. An image sensing system according to claim 12, wherein said platen is between said light source and said lens.

14. An image sensing system according to claim 11, wherein said light sensor system is an array of individual photosensitive elements.

15. An image sensing system according to claim 14, wherein said array of individual photosensitive elements includes a linear array of individual photosensitive elements.

16. An image sensing system according to claim 11, wherein said light source is a light emitting diode.

17. An image sensing system according to claim 11, wherein said light source and said light sensor system are on the same side of said substrate.

18. An image sensing system according to claim 17, wherein said light sensor system is an array of individual photosensitive elements.

19. An image sensing system according to claim 18, wherein said array includes a linear array of individual photosensitive elements.

20. An image sensing system according to claim 17, wherein said light source is a light emitting diode.

* * * * *